(12) United States Patent
Shibayama et al.

(10) Patent No.: US 6,570,622 B2
(45) Date of Patent: May 27, 2003

(54) IMAGE PICKUP APPARATUS AND IMAGE REPRODUCING APPARATUS HAVING AN OPERATING MEMBER

(75) Inventors: Yoshinobu Shibayama, Kanagawa (JP); Atsushi Matsushima, Kanagawa (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/923,305

(22) Filed: Aug. 6, 2001

(65) Prior Publication Data

US 2002/0051066 A1 May 2, 2002

(30) Foreign Application Priority Data

Aug. 7, 2000 (JP) ....................................... 2000-238490
Jul. 11, 2001 (JP) ....................................... 2001-210798

(51) Int. Cl.[7] ........................... H04N 5/225; H04N 5/76; G03B 17/00
(52) U.S. Cl. .................... 348/375; 348/373; 348/220.1; 348/231.4; 396/299
(58) Field of Search ................................. 348/373, 375, 348/376, 220.1, 231.4; 396/283, 297, 299, 312

(56) References Cited

U.S. PATENT DOCUMENTS 4,348,096 A * 9/1982 Katsuma et al. ............ 396/283
5,589,907 A * 12/1996 Hozumi et al. ............. 396/287

* cited by examiner

Primary Examiner—Wendy R. Garber
Assistant Examiner—Justin Misleh
(74) Attorney, Agent, or Firm—Rossi & Associates

(57) ABSTRACT

An image pickup apparatus is provided, which is compact in size but allow the effective use of space inside the apparatus. The image pickup apparatus comprises a sound output section, and an operating member for operating the image pickup apparatus. The operating member has formed therein through holes for transmitting sounds output by the sound output section to an outside of the image pickup apparatus. Typically, the operating member switches between operation modes of the image pickup apparatus. The sound output section is arranged inside the operating member.

10 Claims, 12 Drawing Sheets

IMAGE PICKUP APPARATUS AND IMAGE REPRODUCING APPARATUS HAVING AN OPERATING MEMBER

BACKGROUND OF THE INVENTION

1. Field of the Invention

The present invention relates to an image pickup apparatus and an image reproducing apparatus, which are capable of outputting sounds, and in particular, to an image pickup apparatus and an image reproducing apparatus, which are constructed so as to efficiently arrange a sound output section in a limited space in an apparatus body of a reduced size.

2. Description of Related Art

Apparatuses such as image pickup apparatuses which are capable of outputting sounds are conventionally provided with a sound output section using air vibration.

This sound output section is typically comprised of a magnet mounted on a circular stationary section of the apparatus, a diaphragm mounted on this stationary section and which is excited by the magnet to generate air vibration, and through holes formed in an inner wall of the body of the apparatus to output the generated air vibration to the outside as a sound. Thus, the sound output section typically has a circular external shape. Further, some image pickup apparatuses have a switching operating section for changing a photographing mode. As this switching operating section, a rotary type that switches between a plurality of operation modes is widely used. The switching operating section turns on and off power supply to the image pickup apparatus, switches the operation mode, and switches a recording medium for recording shot images if the image pickup apparatus allows the use of a plurality of recording media. Thus, the switching operating section is frequently used and thereby requires a large size for easy operation. Further, the sound output section and the switching operating section require separately occupied spaces.

SUMMARY OF THE INVENTION

It is an object of the present invention to provide an image pickup apparatus and an image reproducing apparatus, which are compact in size but allow the effective use of space inside the apparatus.

To attain the above object, the present invention provides an image pickup apparatus comprising a sound output section, and an operating member for operating the image pickup apparatus, wherein the operating member has formed therein through holes for transmitting sounds output by the sound output section to an outside of the image pickup apparatus.

Typically, the operating member switches between operation modes of the image pickup apparatus.

In a preferred embodiment of the present invention, the image pickup apparatus further comprises an image pickup device, and wherein when the image pickup apparatus is in an image pickup mode, the through holes formed in the operating member are positioned in a vicinity of the image pickup device, and when the image pickup apparatus is in a reproduction mode for reproduction of images, the through holes formed in the operating member are positioned in a vicinity of the sound output section.

To attain the above object, the present invention also provides an image reproducing apparatus comprising a sound output section, and an operating member for operating the image pickup apparatus, wherein the operating member has formed therein through holes for transmitting sounds output by the sound output section to an outside of the image reproducing apparatus.

Typically, the operating member switches between operation modes of the image reproducing apparatus.

In both the image pickup apparatus and the image reproducing apparatus according to the present invention, the operating member may comprise either a rotary type operating member or a slide type operating member.

Preferably, the sound output section is arranged inside the operating member.

The above and other objects, features, and advantages of the present invention will be apparent from the following specification and drawings.

DETAILED DESCRIPTION OF THE PREFERRED EMBODIMENT

The present invention will be described below in detail with reference to the drawings showing a preferred embodiment thereof.

Figure 1:
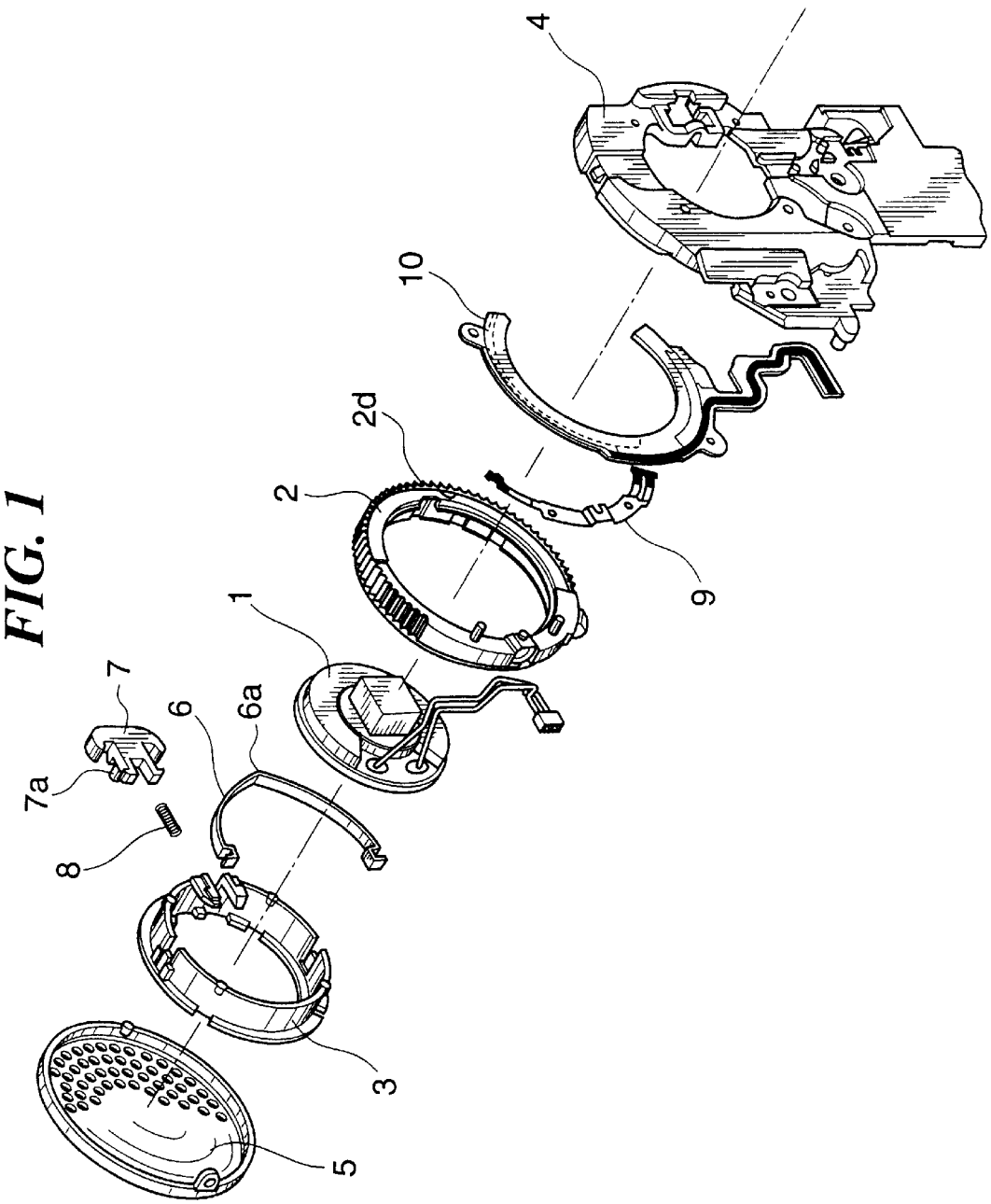
FIG. 1 is an exploded perspective view showing essential parts of an operation mode switching dial of an image pickup apparatus according to an embodiment of the present invention.
Figure 2:
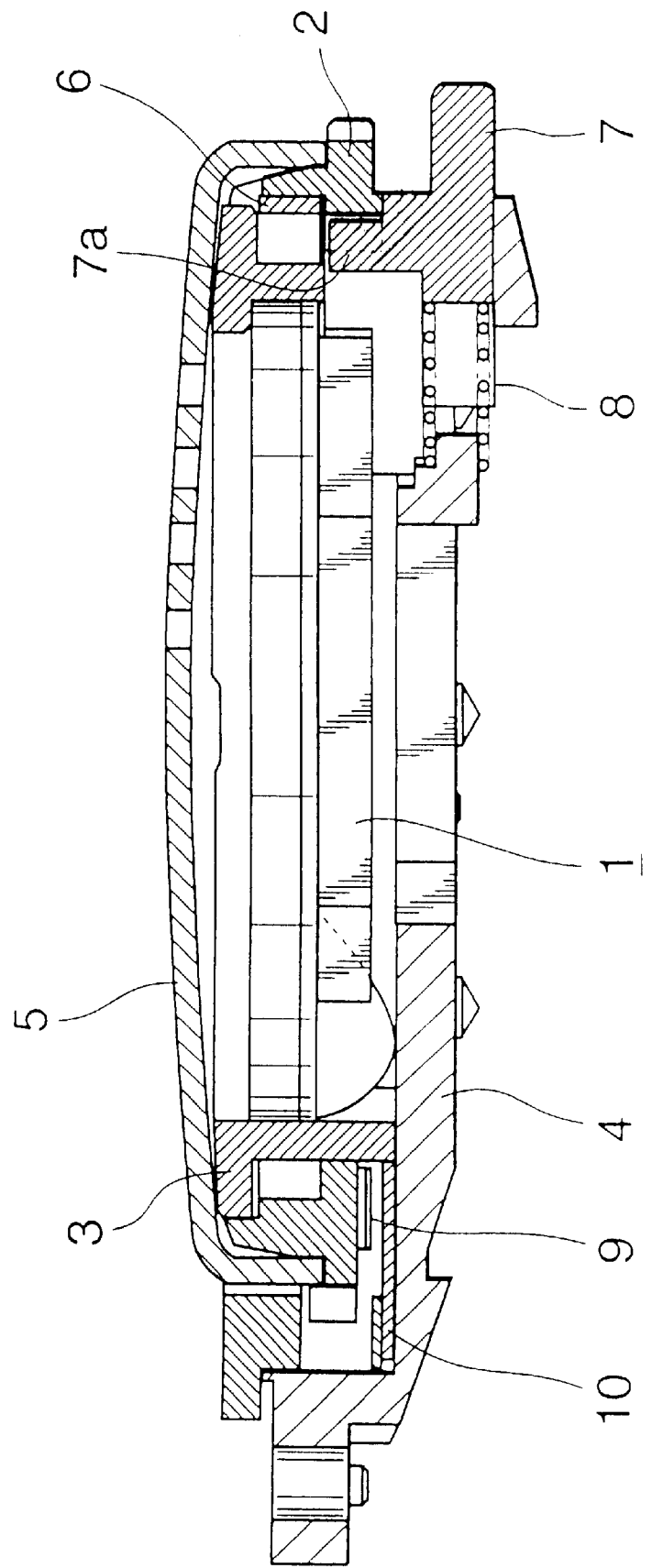
FIG. 2 is a sectional view of the operation mode switching dial in FIG. 1.
Figure 3:
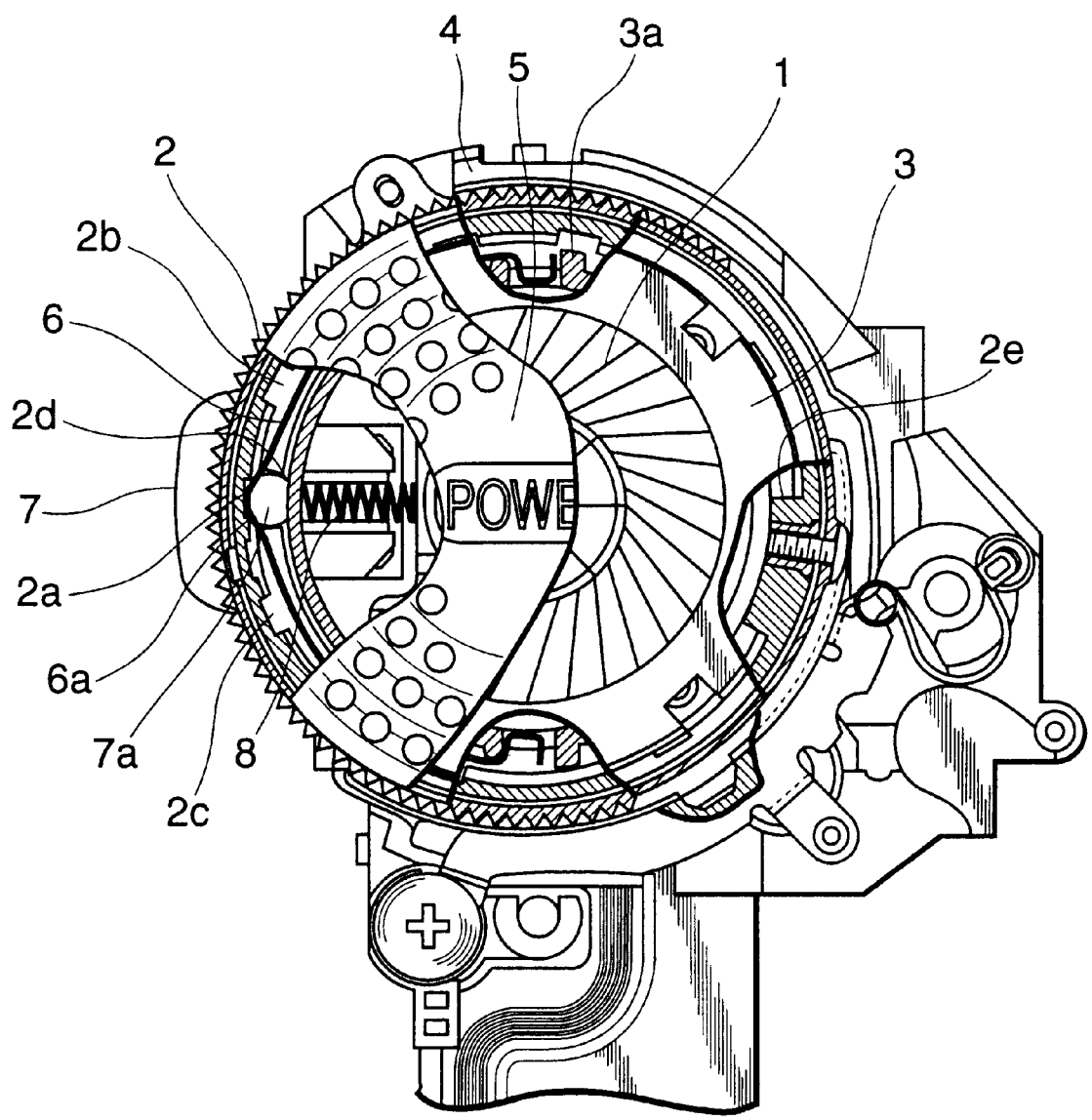
FIG. 3 is a partially cutaway front view showing essential parts of the operation mode switching dial.
Figure 4:
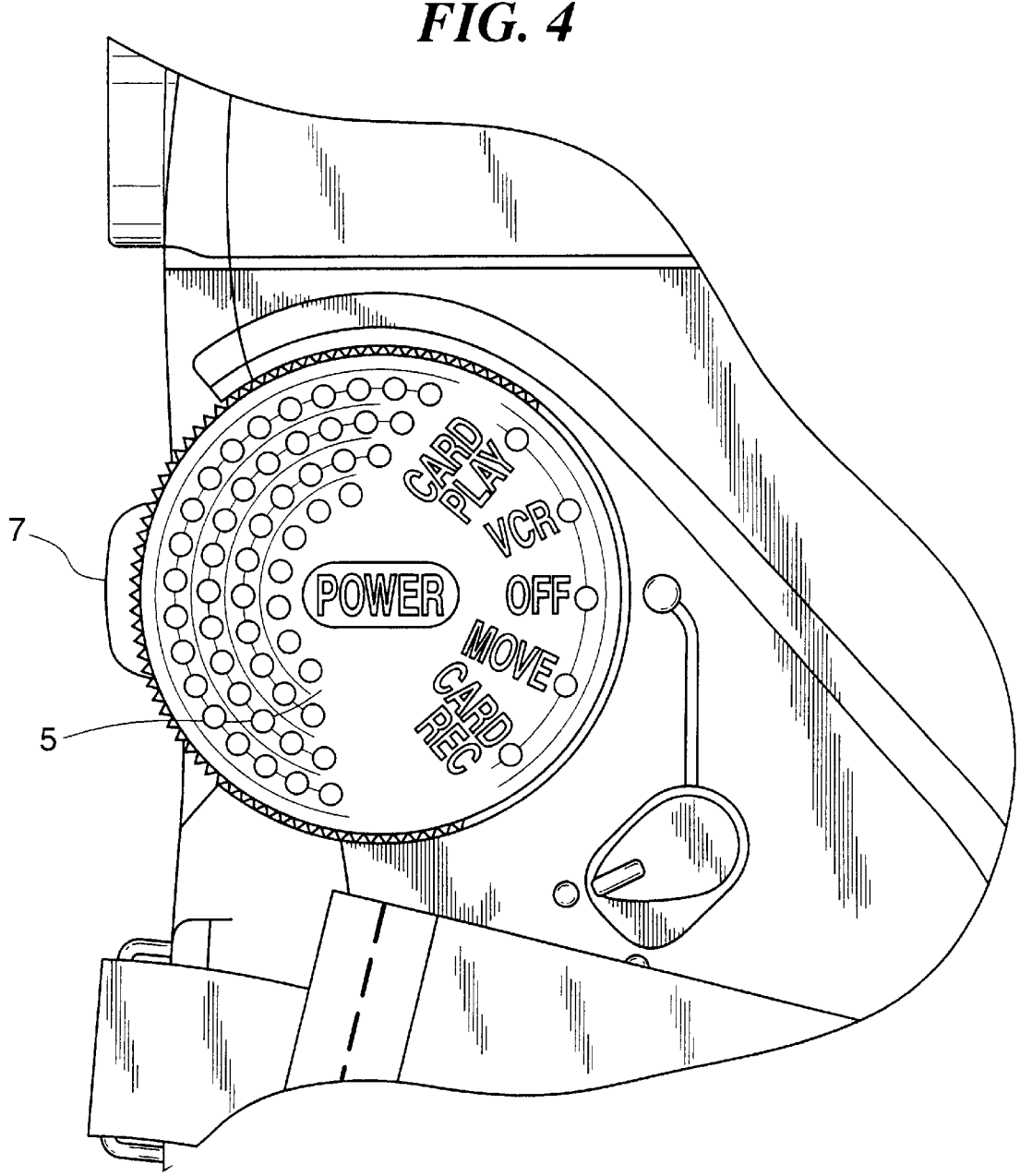
FIG. 4 is a view showing the appearance of the operation mode switching dial section.
Figure 5:
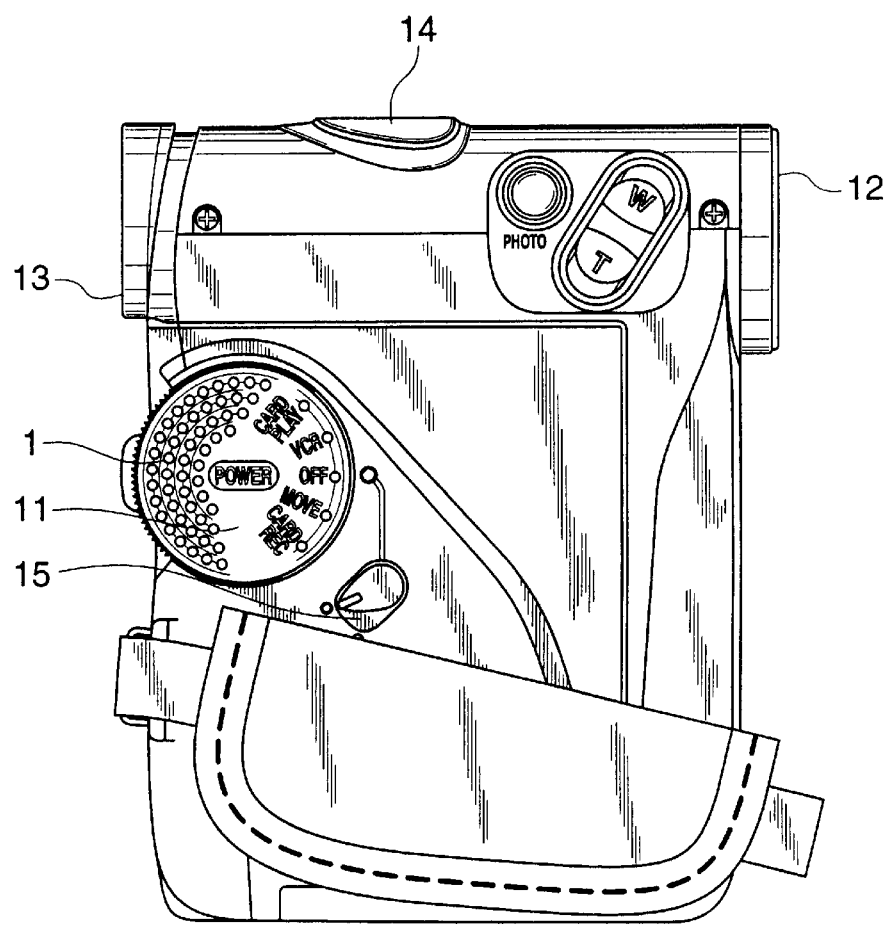
FIG. 5 is a view showing the appearance of the entire image pickup apparatus of the present embodiment.
Figure 6:
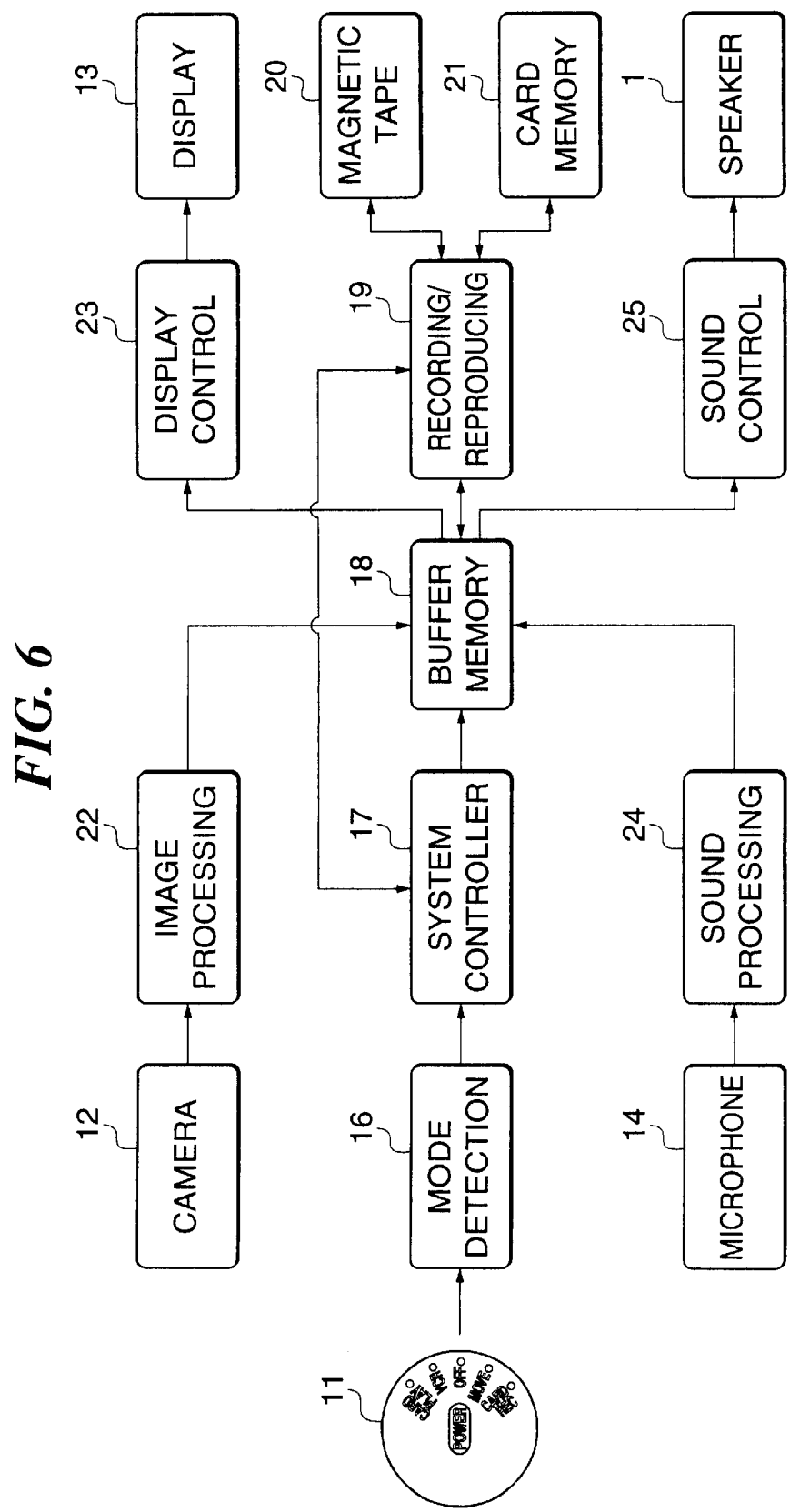
FIG. 6 is a block diagram showing the internal construction of the image pickup apparatus of the present embodiment.

FIGS. 1 to 6 show an image pickup apparatus according to an embodiment of the present invention. FIG. 1 is an exploded perspective view showing essential parts of an operation mode switching dial in the image pickup apparatus according to the present embodiment. FIG. 2 is a sectional view of the operation mode switching dial in FIG. 1. FIG. 3 is a partially cutaway front view showing essential parts of the operation mode switching dial. FIG. 4 is a view showing the appearance of the operation mode switching dial section. FIG. 5 is a view showing the appearance of the entire image pickup apparatus of the present embodiment. FIG. 6 is a block diagram showing the internal construction of the image pickup apparatus of the present embodiment.

In FIG. 6, reference numeral 1 denotes a speaker, and 11 an operation mode switching dial for switching operation modes including a power off mode of the image pickup apparatus, as well as a recording mode and a playing mode of each of two types of image pickup media, a magnetic tape as a magnetic recording medium and a card memory as a semiconductor memory. Reference numeral 12 denotes a camera section, 13 a display section such as an EVF (electronic view finder) or an LCD which displays image signals, 14 a microphone section for inputting sounds, 16 a mode detecting section for detecting the position of the operation mode switching dial 11, 17 a system controller for controlling the entire image pickup apparatus, 18 a buffer memory storing image signals and sound signals, 19 a recording and reproducing section for recording and reproducing the image and sound signals, 20 a magnetic tape as a magnetic recording medium, and 21 a card memory composed of a semiconductor card memory. Further, reference numeral 22 denotes an image processing section for processing image signals output by the camera section 12, 23 a display control section for displaying the image signals on the display section 13, 24 a sound processing section for processing the sound signals input from the microphone section 14, and 25 a sound control section for converting the sound signals into sounds to output the sounds to the speaker First, a recording operation performed by the image pickup apparatus will be described.

Image signals obtained by the camera section 12 are output to the image processing section 22, which then adjusts the image quality of the image signals such as the luminance or hue thereof. The adjusted image signals are stored in the buffer memory 18. The display control section 22 then converts the image signals stored in the buffer memory 18 into signals to be displayed, which are then displayed on the display section 13.

Sound signals input from the microphone section 14 are subjected to gain adjustment and the like by the sound processing circuit 24 and then stored in the buffer memory 18. Here, if the operation mode switching dial 11 is set in a mode position "MOVIE", the recording and reproducing section 19 converts the image and sound signals stored in the buffer memory 18, into recording data of a predetermined format, and then records these data on the magnetic tape 20.

On the other hand, if the operation mode switching dial is set in a mode position "CARD REC", the recording and reproducing section 19 converts the image signals stored in the buffer memory 18, into recording data of a predetermined format, and then records the data in the card memory 21.

Next, a reproducing operation performed by the image pickup apparatus will be described.

If the operation mode switching dial 11 is set in a mode position "VCR", the image and sound signals recorded on the magnetic tape 20 are reproduced by the recording and reproducing section 19, and the reproduced image and sound signals are stored in the buffer memory 18 and then output to the display section 13 via the display control section 23. Further, the sound signals are output to the speaker 1 via the sound control section 25.

On the other hand, if the operation mode switching dial 11 is set in a mode position "CARD PLAY", the image signals recorded in the card memory 21 are reproduced by the recording and reproducing section 19, and the reproduced image signals are stored in the buffer memory 18 and then output to the display section 13 via the display control section 23.

Now, the structure of the operation mode switching dial 11 will be described in detail with reference to FIGS. 1 to 5. A rotary dial 2 is provided internally with recesses 2a, 2b, 2c, ... at locations corresponding, respectively, to a plurality of positions that can be set by the rotary dial 2. Reference numeral 3 denotes a rotation axis member formed by a hollow cylindrical member and functioning as a rotation axis for the rotary dial 2. The speaker 1 is housed inside a hollow portion of the rotation axis member 3. Reference numeral 4 denotes a fixing bottom board that fixes the rotation axis member 3 in place, and reference numeral 5 denotes a dial cover that covers the rotary dial 2. An end wall of the dial cover 5 has a multiplicity of through holes formed therein to transmit sounds emitted by the speaker 1, to the outside.

Reference numeral 6 denotes a click spring for holding, using its elasticity, the rotary dial 2 in a selected one of a plurality of mode positions including the ones described above. When a pointed tip 6a of the click spring 6 slip into one of the plurality of recesses including the ones 2a, 2b, and 2c, described above, formed inside the rotary dial 2, the elastic force of the click spring 6 serves to hold the rotary dial 2 in place so as to keep it from rotating. To rotatively move the rotary dial 2 from the one of the plurality of mode positions to another, the click spring 6 is elastically deformed to allow the rotary dial 2 to be rotatively moved.

Reference numeral 7 denotes a stopper that engages with a rotation inhibiting groove 2d formed inside the rotary dial 2, to inhibit the rotation of the rotary dial 2, when the rotary dial 2 is set in a mode position "OFF" where the power supply to the image pickup apparatus is turned off. A compression spring 8 is interposed between the stopper 7 and the fixing bottom board 4 to always urge and bias the stopper 7 radially outward of the center of rotation of the dial 2. By manually pushing the stopper 7 toward the center of rotation of the rotary dial 2 against the urging force of the compression spring 8, an engaging shaft 7a of the stopper 7 is slipped out from a rotation inhibiting groove 2d, thus allowing the rotary dial 2 to rotate. Inside the rotary dial 2, the rotation inhibiting groove 2d is formed only at a location corresponding to the power off mode position, so that the rotary dial 2 is not inhibited from rotating in the other mode positions, i.e. recording and reproducing positions.

Reference numeral 9 denotes a detection terminal fixed to the rotary dial 2 by heat caulking. Reference numeral 10 denotes a detection substrate disposed opposite the detection terminal 9 and having a gold-plated wiring pattern formed on a surface thereof to detect the positions in which the operation modes of the rotary dial 2 are set, based on combinations of conductive states of the detection terminal 9 and the wiring pattern.

An operation performed by the image pickup apparatus constructed as above will be described. First, FIGS. 2 and 3 show a state where the rotary dial 2 is in the power off mode. At this time, the engaging shaft 7a of the stopper 7 is fitted in the rotation inhibiting groove 2d of the rotary dial 2 and inhibits the rotation of the rotary dial 2 by the urging force of the compression spring 8. In this state, the user pushes the stopper 7 toward the center of rotation of the rotary dial 2 against the urging force of the compression spring 8. Then, the engaging shaft 7a of the stopper 7 slips out from the rotation inhibiting groove 2d of the rotary dial 2, thus allowing the rotary dial 2 to rotate. In this state, the user first tries to rotate the rotary dial 2 counterclockwise as viewed in FIG. 3. Then, with the pointed tip 6a of the click spring 6 inhibiting the rotation of the rotary dial 2, a circumferential end of the recess 2a of the rotary dial 2 presses one of two side slopes of the pointed tip 6a of the click spring 6. The click spring 6 is thereby elastically deformed so that the pointed tip 6a is pushed toward the center of rotation out of the recess 2a of the rotary dial 2, whereby the rotary dial 2 rotates.

After the rotary dial 2 rotates through a certain angle, the pointed tip 6a of the click spring 6 slips into the next recess 2b, whereby the apparatus is brought into the recording operation mode (mode position "MOVIE", shown in FIG. 4) which uses the magnetic tape as an image pickup medium. When the user further tries to rotate the rotary dial 2 counterclockwise, a circumferential end of the recess 2b presses the above-mentioned side slope of the pointed tip 6a of the click spring 6, which is thus elastically deformed so that the pointed tip 6a slips out from the recess 2b, whereby the rotary dial 2 rotates counterclockwise. Then, after the rotary dial 2 further rotates through a certain angle, the pointed tip 6a slips into another one of the recesses, not shown, whereby the apparatus is brought into the recording operation mode (mode position "CARD REC", shown in FIG. 4) which uses the card memory 21 as the image pickup medium. Furthermore, when the user tries to rotate the rotary dial 2 counterclockwise, a rotation stopping wall 2e formed on the rotary dial 2 comes into abutment with a rotation stopping wall 3a formed on the rotation axis member 3 to prevent the rotary dial 2 from further rotating.

Then, in this state, when the user tries to rotate the rotary dial 2 clockwise, one circumferential end of the above entioned one recess, not shown, presses the other of the above mentioned side slopes of the pointed tip 6a of the click spring 6. The click spring 6 is thus elastically deformed so that the pointed tip 6a slips out from the recess, whereby the rotary dial 2 rotates clockwise and thus the pointed tip 6a slips into the recess 2b. A similar operation takes place when the pointed tip 6a is switched from the recess 2b to the recess 2a. When the pointed tip 6a is switched to the recess 2a, that is, when the power off mode is set, the engaging shaft 7a of the stopper 7 slips into the rotation inhibiting groove 2d of the rotary dial 2 by the force of the compression spring 8, thereby inhibiting the rotation of the rotary dial 2, whereby the present image pickup apparatus returns into its initial state.

During the above sequence of operations, the speaker 1, which is mounted inside the fixed rotation axis member 3, is prevented from undergoing unwanted forces whatever operation is performed by the rotary dial 2.

In the initial state of the image pickup apparatus, as the rotary dial 2 is rotated clockwise, the image pickup apparatus is switched to the tape playing mode (mode position "VCR") and then to the card playing mode (mode position "CARD PLAY"). This switching structure is similar to the structure for switching to the tape recording mode (mode position "MOVIE") and then to the card recording mode (mode position "CARD REC").

According to the present embodiment, the speaker 1 is integrated into the operation mode switching dial 2 that switches the operation mode of the image pickup apparatus. Consequently, even if a large operating member is used as the operation mode switching dial 2 so as to switch the operation mode easily, the interior of dial 2 can be used efficiently, thereby making it possible to reduce the size of the image pickup apparatus and to effectively use the space inside the image pickup apparatus.

In the above described embodiment, the present invention is applied to an image pickup apparatus. The present invention, however, is not limited to this, but is applicable to an image reproducing apparatus for reproducing images from magnetic recording media, semiconductor memories, or the like, insofar as they have a sound output section for outputting sounds and an operating section that is operated to switch the operation mode of the apparatus.

Next, a description will be given of a variation according to the above described embodiment of the present invention with reference to FIGS. 7 to 9C.

Figure 7:
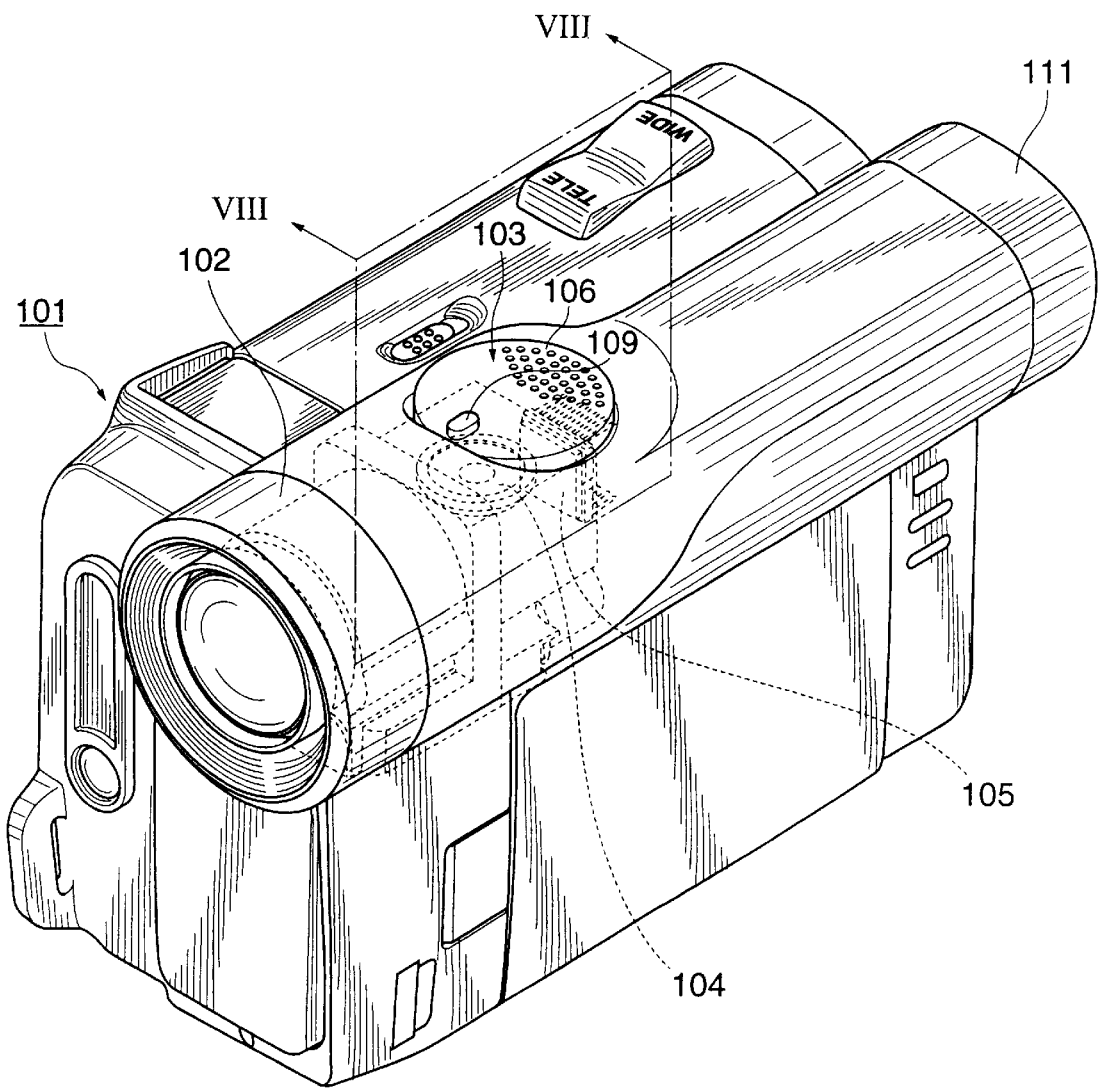
FIG. 7 is a perspective view showing an image pickup apparatus according to a variation of the embodiment shown in FIGS. 1 to 6.

FIG. 7 is a perspective view showing an image pickup apparatus according to this variation. In FIG. 7, the image pickup apparatus 101 has a lens unit 102, an operation mode switching dial 103 for switching the operation mode of the image pickup apparatus 101, a speaker 104 arranged in a space under the operation mode switching dial 03, for outputting sounds, and an image pickup device 105 for converting optical images into electrical signals. An electronic view finder 111 displays images picked up by the image pickup device 105 when the image pickup apparatus 101 is in an image pickup mode, and displays reproduced images when previously recorded images are to be reproduced.

Figure 8:
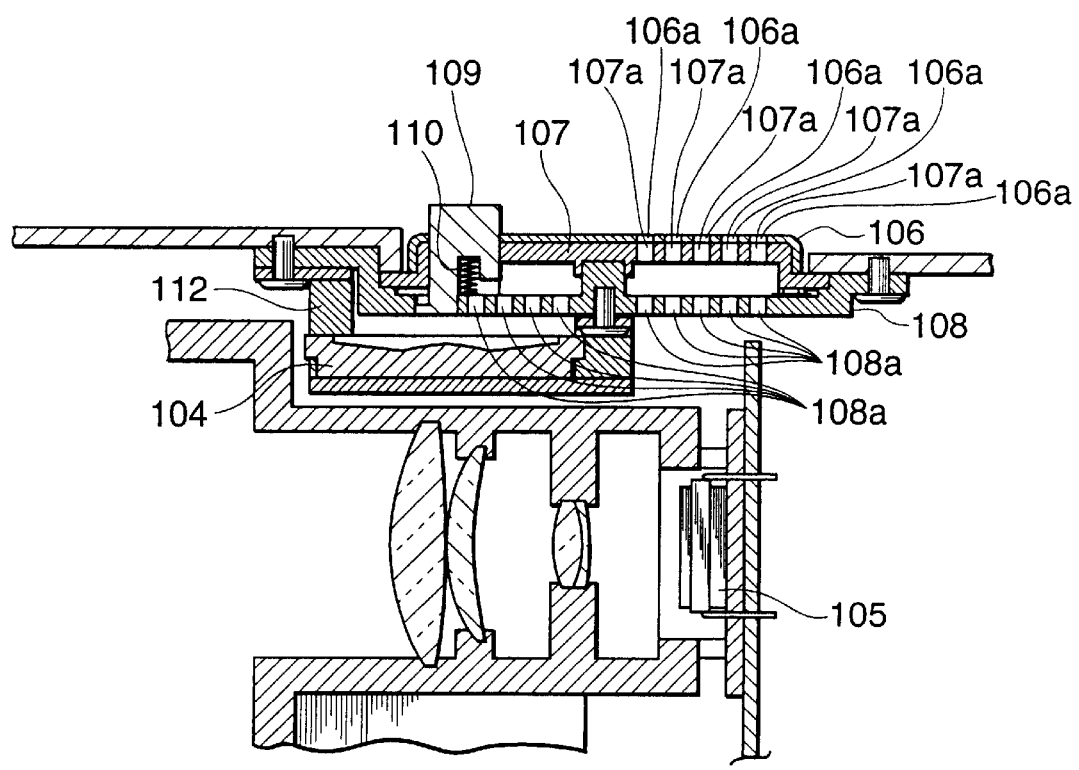
FIG. 8 is a sectional view taken along line VIII—VIII of FIG. 7.

FIG. 8 is a sectional view taken along line a—a in FIG. 7, showing the internal construction of the operation mode switching dial 103 in FIG. 7. The operation mode switching dial 103 has a cover member 106 which has an end wall thereof formed therein with a multiplicity of though holes 106a for transmitting sounds and radiating heat. A support member 107 supports the cover member 106 and is disposed for rotation in unison therewith. The support member 107 has formed therein a multiplicity of through holes 107a similar to the through holes 106a, arranged in alignment with the through holes 106a. The through holes 106a and 107a are arranged in a circular end wall of the dial 103 in a sectorial array over about one quarter of the whole surface area thereof. A member 108 supports the whole dial 103 and is also formed therein with through holes 108a.

Reference numeral 109 denotes an operating knob for switching the dial 103 between operation mode positions. The operating knob 109 is normally biased in an upwardly projected normal position by a spring 110. By manually pushing down the operating knob 109 against the urging force of the spring 110 and rotating the dial 103 through the operating knob 109, the dial 103 can be switched to predetermined operation mode positions. Further, the operating knob also serves as an indicator for indicating the position of a selected operation mode. A holding member 112 holds the speaker 104 in place. As shown in FIG. 8, the speaker 104 and the image pickup device 105 are arranged below the operation mode switching dial 103.

With the structure shown in FIG. 8, as the operation mode of the image pickup apparatus 101 is switched, the through holes 106a and 107a of the dial 103 are moved with rotation of the dial 103. More specifically, when the image pickup apparatus 101 is switched into the image pickup mode for image pickup operation, the through holes 106a, 107a are moved to a location above the image pickup device 105 to dissipate or radiate heat generated by the device 105 into the atmosphere. On the other hand, when the image pickup apparatus 101 is switched into a reproduction mode for reproduction of images, the through holes 106a, 107a are moved to a location above the speaker 104 to transmit sounds generated by the speaker 104 to the outside.

Figure 9A:
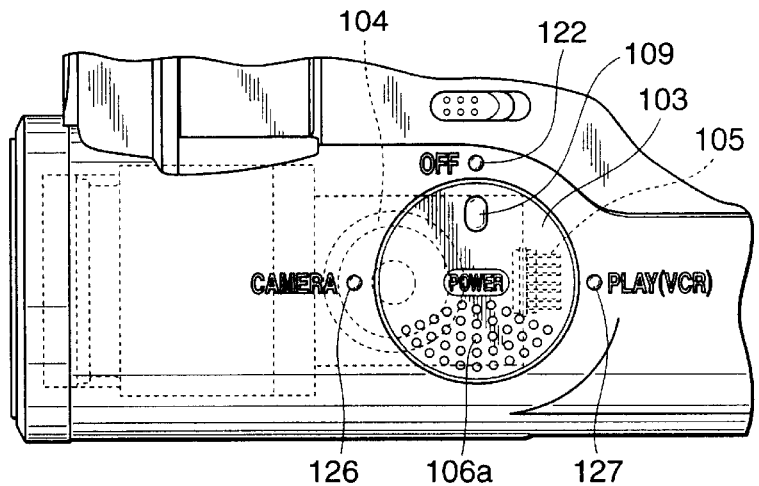
FIGS. 9A to 9C are views showing the positional relationship between through holes in an operation mode switching dial and a speaker and an image pickup device in respective operation modes of the image pickup apparatus, according to the variation.
Figure 9B:
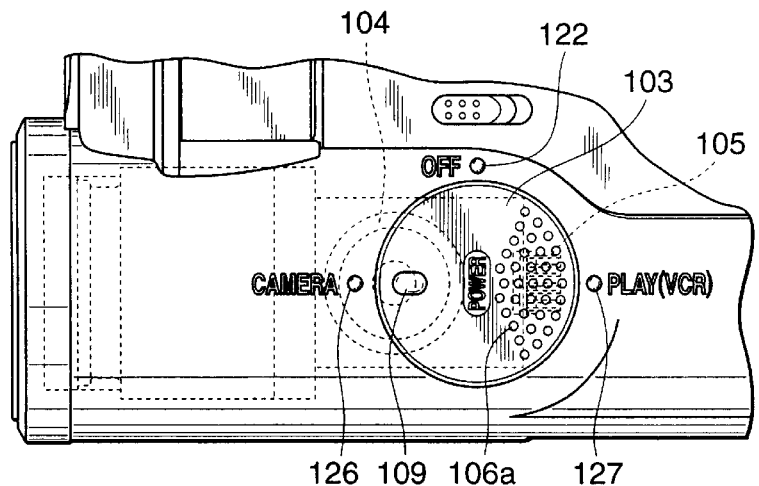
Figure 9C:
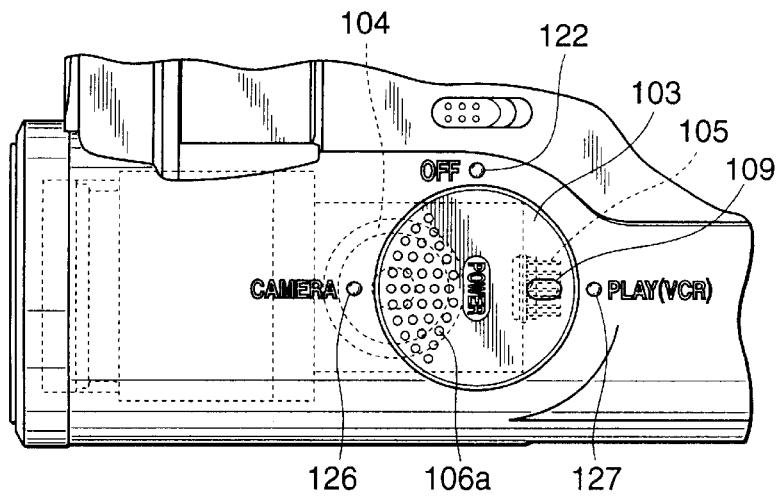

FIGS. 9A to 9C are views showing the positional relationship between the through holes 106a of the operation mode switching dial 103 and the speaker 104 and the image pickup device 105 in respective operation modes of the image pickup apparatus 101, according to the present variation.

In FIGS. 9A to 9C, reference numeral 122 denotes an indicator that is lighted to indicate that the image pickup apparatus 101 is in a power off mode, when the operating knob 109 is positioned opposite the indicator 122. Reference numeral 126 denotes an indicator that is lighted to indicate that the image pickup apparatus 101 is in an image pickup mode in which the image pickup device 105 is driven to shoot an object, when the operating knob 109 is positioned opposite the indicator 126. Reference numeral 127 denotes an indicator that is lighted to indicate that the image pickup apparatus 101 is in a reproduction mode in which an image recorded on a recording medium, not shown, is reproduced and displayed on the electronic view finder 111, when the operating knob 109 is positioned opposite the indicator 127.

FIG. 9A shows a position assumed by the through holes 106a when the image pickup apparatus 101 is in the power off mode. When the image pickup apparatus 101 is brought into the power off mode, the through holes 106a are moved to a location where dust or the like cannot enter the speaker 104 and the image pickup device 105.

FIG. 9B shows a position assumed by the through holes 106a when the image pickup apparatus 101 is in the image pickup mode. When the image pickup apparatus 101 is brought into the image pickup mode through rotation of the dial 103, the through holes 106a are moved to a location above the image pickup device 105 which operates in the image pickup mode. Thus, heat generated by the image pickup device 105 can be radiated into the atmosphere.

FIG. 9C shows a position assumed by the through holes 106a when the image pickup apparatus 101 is in the reproduction mode. When the image pickup apparatus 101 is brought into the reproduction mode through rotation of the dial 103, the through holes 106a are moved to a location above the speaker 104, to transmit sounds output by the speaker 104 to the outside.

Next, a description will be given of another variation of the above-described embodiment with reference to FIGS. 10 to 12C. In this variation, the rotary-type operation mode switching dial 103 shown in FIG. 7 is replaced by a slide-type operation mode switching switch 133. In FIGS. 10 to 12C, elements and parts corresponding or equivalent to those in FIGS. 7 to 9C are designated by identical reference numerals, description of which is omitted.

Figure 10:
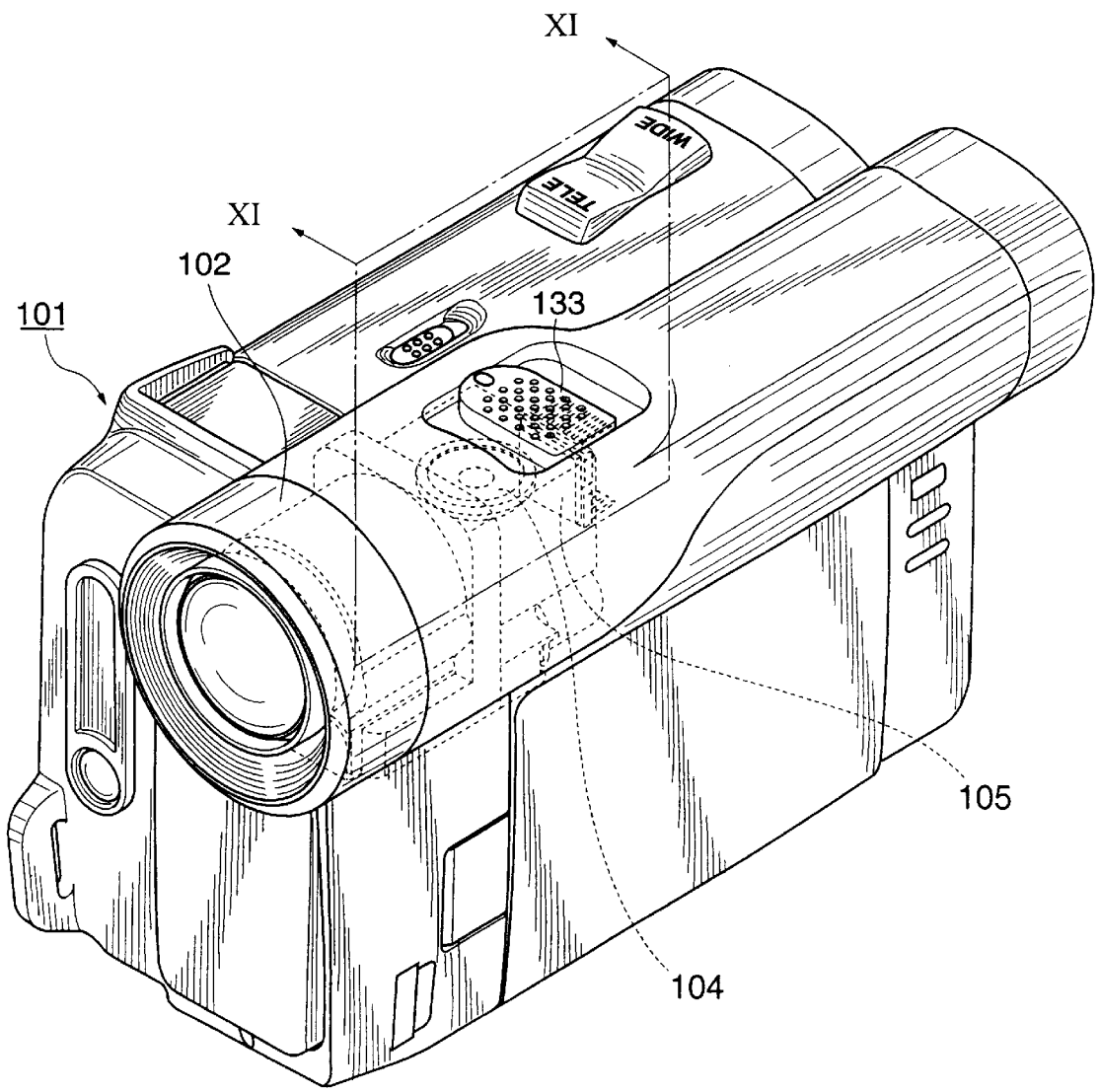
FIG. 10 is a perspective view showing an image pickup apparatus according to another variation of the embodiment shown in FIGS. 1 to 6.
Figure 11:
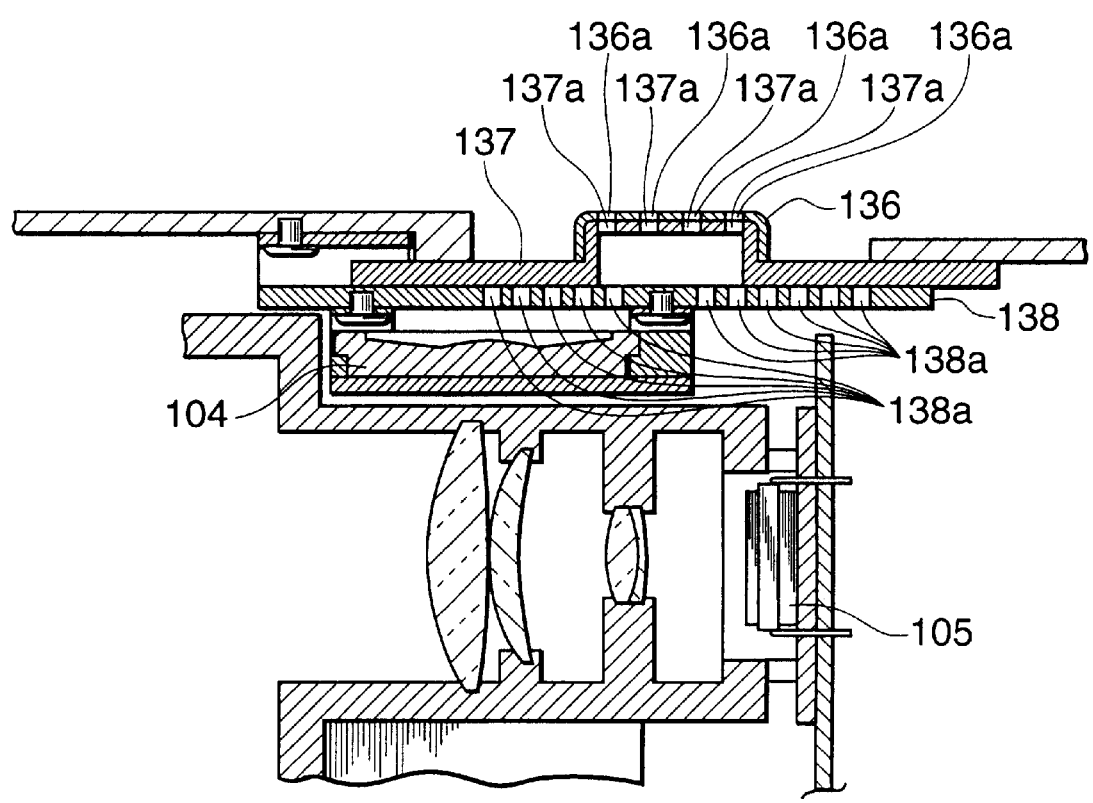
FIG. 11 is a sectional view taken along line XI—XI of FIG. 10.

FIG. 10 is a perspective view showing an image pickup apparatus according to this variation. FIG. 11 is a sectional view taken along line b—b in FIG. 10, showing the internal construction of the slide-type operation mode switching switch 133. As shown in FIGS. 10 and 11, the slide-type operation mode switching switch 133 is arranged above the speaker 104 and the image pickup device 105. The operation mode switching switch 133 has a cover member 136 which has an end wall thereof formed therein with a multiplicity of though holes 136a for transmitting sounds and radiating heat. A support member 137 supports the cover member 136 and is disposed for movement in unison therewith. The support member 137 has formed therein a multiplicity of through holes 137a similar to the through holes 136a, arranged in alignment with the through holes 136a. A member 138 supports the whole switch 133 and is also formed therein with through holes 138a.

With the structure shown in FIGS. 10 and 11, as the operation mode of the image pickup apparatus 101 is switched, the through holes 136a and 137a of the switch 133 are moved with sliding movement of the switch 133. More specifically, when the image pickup apparatus 101 is switched into the image pickup mode for image pickup operation, the through holes 136a, 137a are moved to a location above the image pickup device 105 to dissipate or radiate heat generated by the device 105 into the atmosphere. On the other hand, when the image pickup apparatus 101 is switched into the reproduction mode for reproduction of images, the through holes 136a, 137a are moved to a location above the speaker 104 to transmit sounds generated by the speaker 104 to the outside.

Figure 12A:
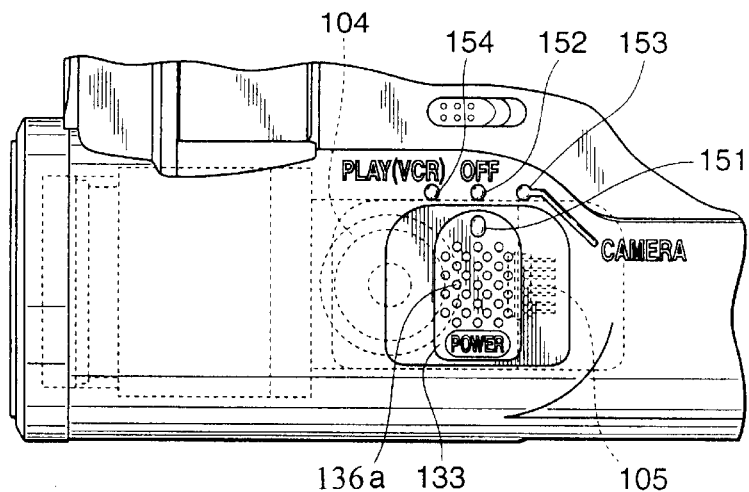
FIGS. 12A to 12C are views showing the positional relationship between through holes in an operation mode switching dial and a speaker and an image pickup device in respective operation modes of the image pickup apparatus, according to the other variation.
Figure 12B:
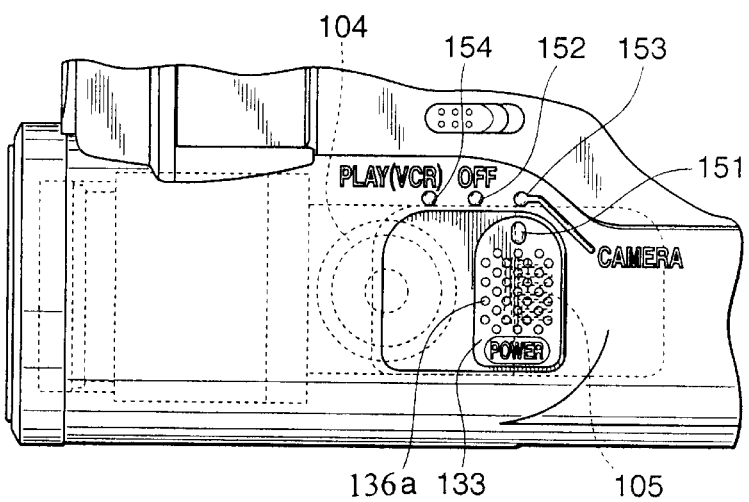
Figure 12C:
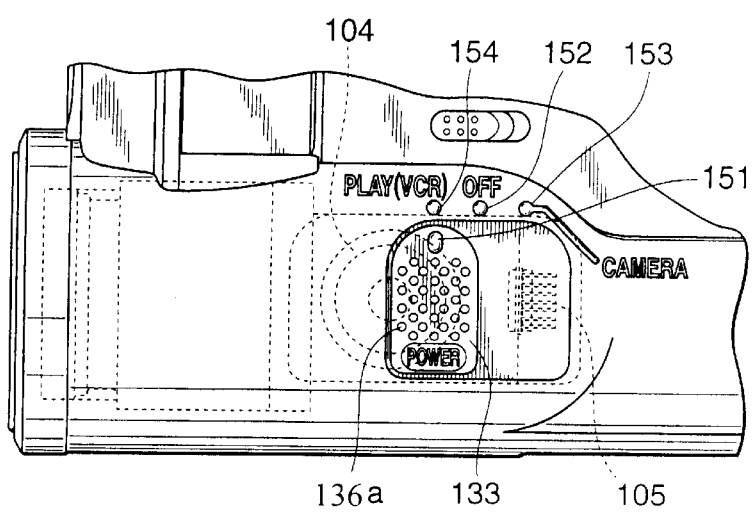

FIGS. 12A to 12C are views showing the positional relationship between the through holes 136a of the operation mode switching switch 133 and the speaker 104 and the image pickup device 105 in respective operation modes of the image pickup apparatus 101, according to the present variation.

In FIGS. 12A to 12C, reference numeral 151 denotes an operating element that indicates the position of a selected operation mode. Reference numeral 152 denotes an indicator that is lighted to indicate that the image pickup apparatus 101 is in the power off mode, when the operating knob 151 is positioned opposite the indicator 152. Reference numeral 153 denotes an indicator that is lighted to indicate that the image pickup apparatus 101 is in the image pickup mode in which the image pickup device 105 is driven to shoot an object, when the operating knob 151 is positioned opposite the indicator 153. Reference numeral 154 denotes an indicator that is lighted to indicate that the image pickup apparatus 101 is in the reproduction mode in which an image recorded on a recording medium, not shown, is reproduced, when the operating knob 151 is positioned opposite the indicator 154.

FIG. 12A shows a position assumed by the through holes 136a when the image pickup apparatus 101 is in the power off mode. When the image pickup apparatus 101 is brought into the power off mode, the through holes 136a are moved together with sliding movement of the switch 133 to a location where dust or the like cannot enter the speaker 104 and the image pickup device 105.

FIG. 12B shows a position assumed by the through holes 136a when the image pickup apparatus 101 is in the image pickup mode. When the image pickup apparatus 101 is brought into the image pickup mode through sliding movement of the switch 133, the through holes 136a are moved to a location above the image pickup device 105 which operates in the image pickup mode. Thus, heat generated by the image pickup device 105 can be radiated into the atmosphere.

FIG. 12C shows a position assumed by the through holes 136a when the image pickup apparatus 101 is in the reproduction mode. When the image pickup apparatus 101 is brought into the reproduction mode through sliding movement of the switch 133, the through holes 136a are moved to a location above the speaker 104, to transmit sounds output by the speaker 104 to the outside.

As described above, according to the variations of the embodiment, when the image pickup apparatus is brought into the image pickup mode through operation of the dial 103 or the switch 133, the through holes formed in the dial 103 or the switch 133 are moved to such a location in the vicinity of the image pickup device as to dissipate or radiate heat generated by the image pickup device, whereas, when the image pickup apparatus is brought into the reproduction mode for image reproduction through operation of the dial 103 or the switch 133, the through holes formed in the dial or the switch 133 are moved to such a location in the vicinity of the speaker as to transmit sounds output by the speaker to the outside.

What is claimed is:

1. An image pickup apparatus comprising:

a sound output section for outputting sounds stored together with images; and an operating member for selecting modes including a first mode for reproducing a still image and a second mode for reproducing a movie image;

wherein said operating member has formed therein through holes for transmitting the sounds output by said sound output section to an outside of the image pickup apparatus, and wherein said operating member is disposed so that the sounds output by said sound output section pass said through holes in both said first and second modes.

2. An image pickup apparatus according to claim 1, further comprising an image pickup device, and wherein:

when the image pickup apparatus is in an image pickup mode, said through holes formed in said operating member are positioned in a vicinity of said image pickup device; and when the image pickup apparatus is in a reproduction mode for reproduction of images, said through holes formed in said operating member are positioned in a vicinity of said sound output section.

3. An image pickup apparatus according to claim 1, wherein said operating member comprises a rotary type operating member.

4. An image pickup apparatus according to claim 1, wherein said operating member comprises a slide type operating member.

5. An image pickup apparatus according to claim 1, wherein said sound output section is arranged inside said operating member.

6. An image reproducing apparatus comprising:

a sound output section for outputting sounds stored together with images; and an operating member for selecting modes including a first mode for reproducing a still image and a second mode for reproducing a movie image;

wherein said operating member has formed therein through holes for transmitting the sounds output by said sound output section to an outside of the image reproducing apparatus, wherein said operating member is disposed so that the sounds output by said sound output section pass said through holes in both said first and second modes.

7. An image reproducing apparatus according to claim 6, wherein said operating member comprises a rotary type operating member.

8. An image reproducing apparatus according to claim 6, wherein said operating member comprises a slide type operating member.

9. An image reproducing apparatus according to claim 6, wherein said sound output section is arranged inside said operating member.

10. An image pickup apparatus comprising:

a sound output section;

an operating member for operating the image pickup apparatus; and an image pickup device, wherein said operating member switches between operation modes of the image pickup apparatus, wherein said operating member has formed therein through holes for transmitting sounds output by said sound output section to an outside of the image pickup apparatus, wherein when the image pickup apparatus is in an image pickup mode, said through holes formed in said operating member are positioned in a vicinity of said image pickup device, and wherein when the image pickup apparatus is in a reproduction mode for reproduction of images, said through holes formed in said operating member are positioned in a vicinity of said sound output section.

* * * * *